3,386,903
METHOD FOR PREPARING OXIMINOMETHYL BENZOIC ACID
Yoshikazu Ito, Mizuho-ku, Nagoya, Shigeru Wakamatsu, Midori-ku, Nagoya, and Yoichi Shimokawa, Minami-ku, Nagoya, Japan., assignors to Toyo Rayon Kabushiki Kaisha, Tokyo, Japan, a corporation of Japan
Filed July 24, 1964, Ser. No. 384,874
Claims priority, application Japan, July 26, 1963, 38/37,566
10 Claims. (Cl. 204—158)

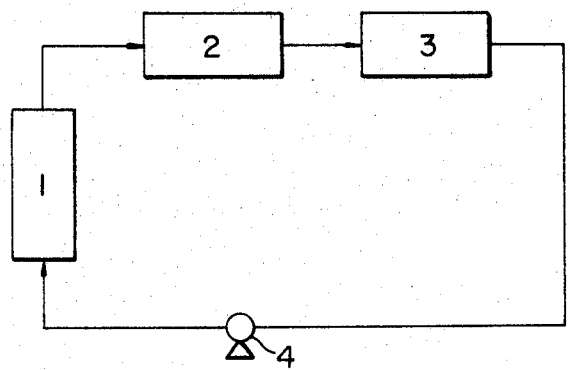

ABSTRACT OF THE DISCLOSURE

A method for preparing oximinomethyl benzoic acid by contacting an inert solvent solution of o-, m-, or p-toluic acid, or mixtures thereof with a nitrosating agent such as nitrosyl chloride in the presence of light at atmospheric pressure and a temperature between about 0° C. and 30° C.

---

The present invention relates to a method for preparing oximinomethyl benzoic acid. More particularly, the present invention relates to a method for preparing oximinomethyl benzoic acid which comprises dissolving toluic acid in a suitable solvent, and subjecting the mass to the action of a nitrosating agent in the presence of light.

Oximinomethyl benzoic acid is an intermediate material which facilitates the manufacture of aminomethyl benzoic acid and aminomethyl cyclohexyl carboxylic acid in good yield. It is possible to produce from these compounds (including p-amino benzoic acid, and 4-aminomethyl cyclohexyl carboxylic acid), the highly heat-resistant polyamide which contains a benzene ring or a cyclohexane ring in the polymer chain.

Heretofore, practically nothing has been known of the method for preparing oximinomethyl benzoic acid; only the following methods having been disclosed.

(a) Method of reacting phthalaldehydic acid with hydroxylamine as follows:

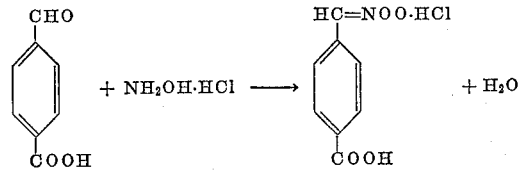

[Reingless, Ber. 24 2424 (1891), L. W. F. Kampschmidt and J. P. Wibaut, Rec. trav. chem. 71 601–8 (1952)]; and (b) Method of partially oxidizing aminomethyl benzoic acid

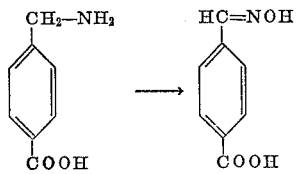

[K. Kahr and C. Berther, Chem. Ber. 93 132–6 (1960)]

However, with the method (a), the synthesis of raw phthalaldehydic acid starting material is extremely complicated. The following process is known as a typical synthetic method for obtaining this raw material.

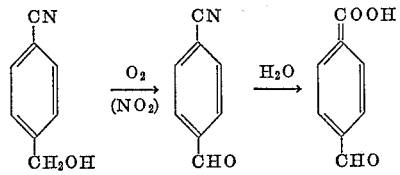

Another known method of manufacturing the phthalaldehydic acid comprises the oxidation of toluic acid. These synthetic processes involve many steps and are complicated. Moreover, owing to the high costs, particularly of hydroxylamine, they are almost impracticable from the standpoint of commercial production.

Furthermore, method (b) represents a reverse case to the object of the present invention, that is, the production of aminomethyl benzoic acid with ease and in good yield.

Next, as commonly practiced in the synthesis of said aminomethyl benzoic acid, a method of halogenating and then aminating toluic acid is known which is based on a reaction indicated by the following formula:

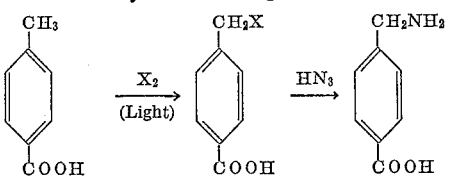

[Glanzstoff, Brit. P. 760,086 (1956)]

The second step of the above reaction sequences poses a problem. The intended primary amine is produced in low yield, and secondary or tertiary amines are always concurrently produced in considerable amounts, making this process disadvantageous from an economic point of view.

An object of the present invention is to provide a method for manufacturing oximinomethyl benzoic acid in a high yield and easily with a minimization of the production of by-products. Another object of the present invention is to provide a method for manufacturing oximinomethyl benzoic acid from toluic acid. A further object of the present invention is to provide a most suitable intermediate raw material for the manufacture of aminomethyl benzoic acid and aminomethyl cyclohexyl carboxylic acid.

As a result of research directed to the aforesaid objects, we have found that when toluic acid dissolved in a suitable solvent is subjected to the action of a nitrosating agent in the presence of light, oximinomethyl benzoic acid is obtained very advantageously and effectively from the standpoint of commercial production.

It has previously been known that the photonitrosation reaction of cycloalkanes produces the corresponding cycloalkanone oxime. However, it has been newly discovered that the photonitrosation of toluic acid dissolved in a suitable solvent also produces oximinomethyl benzoic acid.

While it is known that a carboxyl group replaced in a benzene ring considerably affects the reactivity of said benzene ring and other replaced groups, it is a completely novel discovery that toluic acid which contains a methyl group and a carboxyl group in the benzene ring can be similarly subjected to the photonitrosation reaction.

The method claimed in the present invention for the manufacture of oximinomethyl benzoic acid comprises dissolving toluic acid in a solvent which does not react with a nitrosating agent even under the irradiation by light, and thereafter subjecting the mass to the action of a nitrosating agent under the irradiation of light.

The toluic acid used in the process of the present invention may be any of the three isomers, i.e., o-, m-, and p-toluic acids, or mixtures thereof.

A suitable solvent for use in the process of the present invention is of the type which does not react at all or hardly reacts with a nitrosating agent in the presence of light, and sufficiently dissolves toluic acid. The solvents thus defined, include, for example, polyhalogenated hydrocarbons which are liquids at room temperature. Particularly preferred for the process are chloroform, tetrachloroethane, pentachloroethane, carbon tetrachloride, chlorobenzene and benzene.

Nitrosyl chloride is usually suitable as the nitrosating agent to be used in the process of the present invention. However, a mixture of chlorine and nitrogen monoxide or a mixture of nitrose gas (consisting of a mixed gas of nitrogen monoxide and nitrogen dioxide) and hydrogen chloride may also be used as effectively.

Suitable light sources for the process of the present invention include, for example, a low pressure mercury lamp, high pressure mercury lamp, xenon lamp, various types of fluorescent lamp and tungsten lamp which are used in the ordinary photonitrosation reaction. However, the light sources as used in the process of the present invention are not limited to them.

The reaction conditions of the instant process, including temperature and pressure may cover the same range as is usually used in the photonitrosation of cycloalkanes. However, particularly favorable are atmospheric pressure and temperatures of 0–30° C. Like the photonitrosation of cycloalkanes; the present process can be effected in good yield, suppressing the development of side reactions and consequently with advantage, if the reaction involved is conducted in the presence of excess amounts of hydrogen chloride.

In the process of the present invention, either a batch or continuous method may be used. However, the preferable operation of the process of the present invention consists in carrying out a continuous reaction by circulating large amounts of the solvent in which solid toluic acid has been dissolved. The attached drawing is a block diagram showing the flow of circulation involved in the subject process, wherein 1 is a photo-reaction vessel, 2 a product separation step, 3 a toluic acid dissolving step and 4 a pump for circulation.

As previously described, the o-, m- and p-oximinomethyl benzoic acids are important intermediate raw materials for the synthesis of aminomethyl benzoic acid and aminomethyl cyclohexyl carboxylic acid. In other words, it is possible to manufacture polyamide with a benzene or cyclohexane ring by hydrogenating said intermediate to synthesize o-, m- and p-aminomethyl benzoic acid, or 2-, 3-, or 4-aminomethyl cyclohexyl carboxylic acid—(1) and thereafter copolymerizing the product with other amino acids or lactams, particularly with ε-caprolactam.

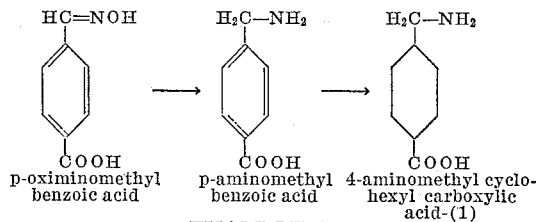

p-oximinomethyl benzoic acid → p-aminomethyl benzoic acid    4-aminomethyl cyclohexyl carboxylic acid-(1)

EXAMPLE 1

A cylindrical glass reactor with an inner diameter of 8.0 cm. and a height of 25 cm. and provided with a discharge stopper at the bottom was charged with a solution of 40 g. of p-toluic acid in 1500 g. of chloroform. In the mass was immersed a light source consisting of a 270 watt bar-like high pressure mercury lamp encased in a glass tube open at one end and provided with a cooling water jacket. With the mercury lamp lighted, and the reactor temperature maintained at 10–15° C., a mixed gas of nitrosyl chloride and hydrogen chloride was charged into the lower portion of the reaction liquid at the rate of 100 cc./min. for the former and 400 cc./min. for the latter. The reaction liquid turned from colorless to light yellow, and subsequently white or light yellow crystals were observed to precipitate. After 1-hour reaction, the reaction liquid was completely discharged, and 12.2 g. of white or light yellow crystals were obtained by filtration. When this material which was soluble in an alkaline aqueous solution was made slightly acidic white crystals again precipitated. These crystals weighed 10.1 g. and melted at 218° C. Elemental analysis of the product was in good accord with the theoretical values of those of p-oximinomethyl benzoic acid, as shown below.

Product, weight percent C, 58.3; H, 4.3; O, 29.0; N, 8.4. Theoretical analytical values for oximinomethyl benzoic acid, weight percent C, 58.1; H, 4.25; O, 29.1; N, 8.48.

The initially obtained crystals were a hydrochloride of p-oximinomethyl benzoic acid.

EXAMPLE 2

The reaction was conducted in the manner described in Example 1. In this case the reaction liquid was circulated as illustrated in the attached drawing. Reaction was continued while the product was separated and fresh p-toluic acid was supplied continuously. After a 3-hour reaction period, 36.5 g. of the hydrochloride of p-oximinomethyl benzoic acid were obtained, and therefrom 30.45 g. of p-oximinomethyl benzoic acid.

Having described the specification, we claim:

1. A method for the preparation of oximinomethyl benzoic acids from toluic acids, said method comprising contacting under irradiation by light a nitrosating agent and a solution of at least one toluic acid in an organic solvent, said solvent being inert to the nitrosating agent, to produce oximinomethyl benzoic acid.

2. A method as claimed in claim 1 wherein the toluic acid is p-toluic acid.

3. A method as claimed in claim 1 wherein the nitrosating agent is selected from the group consisting of nitrosyl chloride, a mixture of chlorine and nitrogen monoxide and a mixture of hydrogen chloride and a mixture of nitrogen monoxide and nitrogen dioxide.

4. A method as claimed in claim 3 wherein the nitrosating agent is nitrosyl chloride.

5. A method as claimed in claim 1 wherein the organic solvent is selected from the group consisting of polyhalogenated hydrocarbons which are liquid at room temperature and benzene.

6. A method as claimed in claim 5 wherein the polyhalogenated hydrocarbon is selected from the group consisting of chloroform, carbon tetrachloride, tetrachloroethane, pentachloroethane, and chlorobenzene.

7. A method as claimed in claim 6 wherein the polyhalogenated hydrocarbon is chloroform.

8. A method as claimed in claim 1 wherein the nitrosating agent and the solution of toluic acid are contacted at atmospheric pressure and a temperature between 0° C. and 30° C.

9. A method as claimed in claim 1 comprising contacting the nitrosating agent and the solution of toluic acid in the presence of excess hydrogen chloride.

10. A method as claimed in claim 1 comprising continuously removing the oximinomethyl benzoic acid as it is produced and contacting fresh portions of nitrosating agent and dissolved toluic acid.

References Cited

UNITED STATES PATENTS 3,045,011  7/1962  Nussbaum _____ 204—158 X
3,047,482  7/1962  Cheng et al. _____ 204—162

HOWARD S. WILLIAMS, *Primary Examiner.*